United States Patent [19]
Bickel

[11] 3,929,167
[45] Dec. 30, 1975

[54] INSULATION DEVICE FOR PROTECTION AGAINST HEAT

[76] Inventor: Bruce T. Bickel, Rte. 3, Box 21, Brookville, Ohio 45309

[22] Filed: Oct. 29, 1974

[21] Appl. No.: 518,504

[52] U.S. Cl. ............ 138/151; 138/DIG. 2; 161/403
[51] Int. Cl.² ...................... F16L 59/02; F16L 9/14
[58] Field of Search .......... 138/138, 141, 147, 149, 138/150, 151, DIG. 2, 137; 161/403; 220/9 D, 88 R

[56] References Cited
UNITED STATES PATENTS

| | | | |
|---|---|---|---|
| 2,089,492 | 8/1937 | Lambert | 138/149 |
| 2,650,180 | 8/1953 | Walker | 138/149 |
| 3,009,601 | 11/1961 | Matsch | 138/DIG. 2 |
| 3,053,715 | 9/1962 | Labino | 138/141 |
| 3,092,529 | 6/1963 | Pearson | 138/149 |
| 3,092,530 | 6/1963 | Plumber | 138/151 |
| 3,346,016 | 10/1967 | Blsa | 138/138 |
| 3,573,123 | 3/1971 | Siegel | 138/141 |
| 3,770,569 | 11/1973 | Breiner | 161/403 |
| 3,874,711 | 4/1975 | Scalzo | 138/149 |

OTHER PUBLICATIONS
Thermal Insulation, NASA SP-5930(01), 1970, "Inexpensive Cryogemic Insulation Replaces Vacuum Jacket", p. 5.

Primary Examiner—Richard E. Aegerter
Assistant Examiner—A. Jason Mirabito
Attorney, Agent, or Firm—Melvin Wiviott

[57] ABSTRACT

An insulation device to protect electric cables, pneumatic or hydraulic lines, switch boxes, pipes and the like from intense heat. The insulation device has a plurality of layers of insulating material which is comprised of multi air cell non combustible material and asbestos; preferably high temperature electronic needled fiberglass and high temperature asbestos millboard structured in an alternating sequence. The layers of insulation preferably are configured into inner and outer insulation portions arranged in staggered relationship with each other, overlapping circumferential end portions, and layered collars of asbestos and multi air cell non combustible material circumscribing abutting end sections of adjacent outer insulation portions. Additionally, the structure is configurable with a side comprising inner and outer insulation portions that can be opened and closed for placement about an element to be insulated, and end sections engaging each other in a telescopically fitted manner.

18 Claims, 8 Drawing Figures

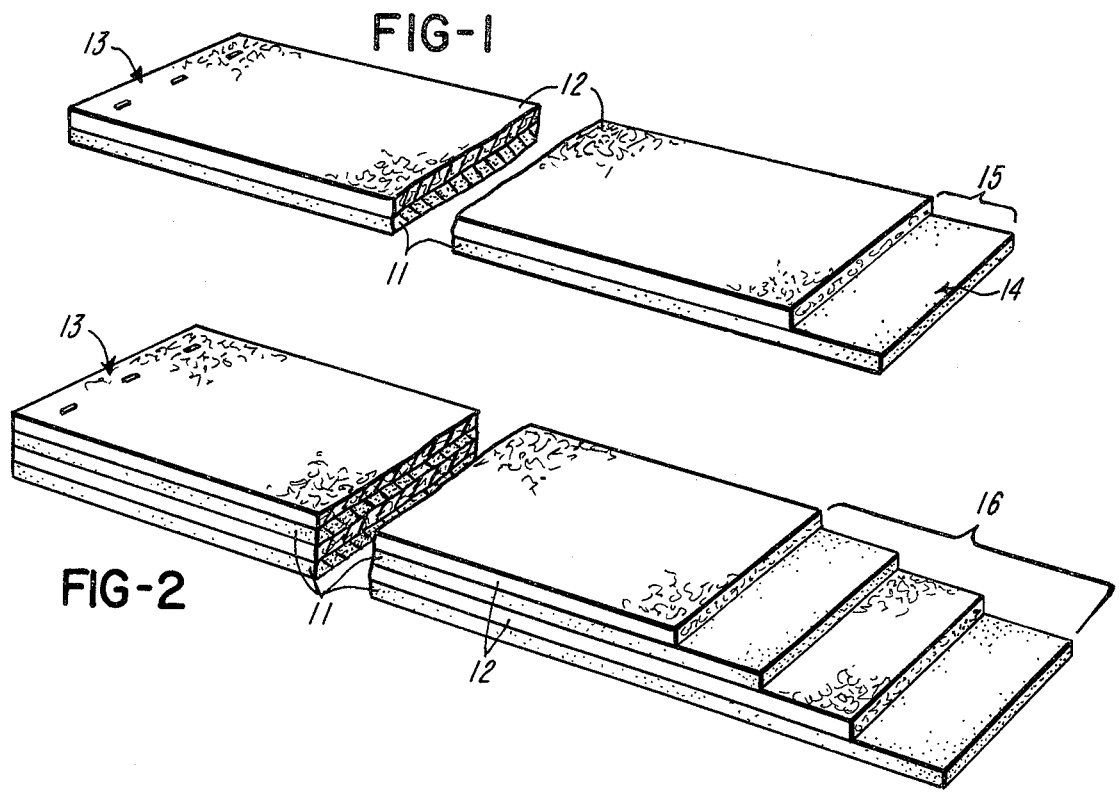
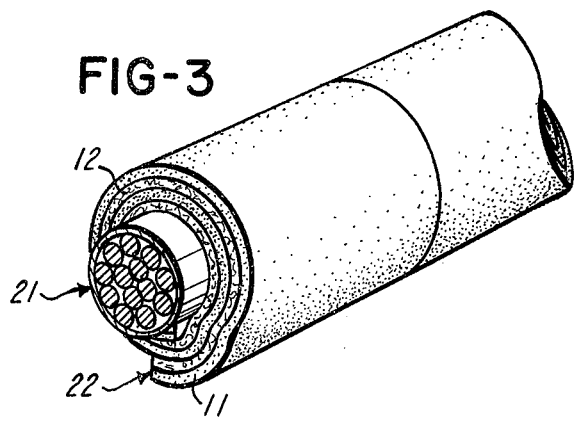
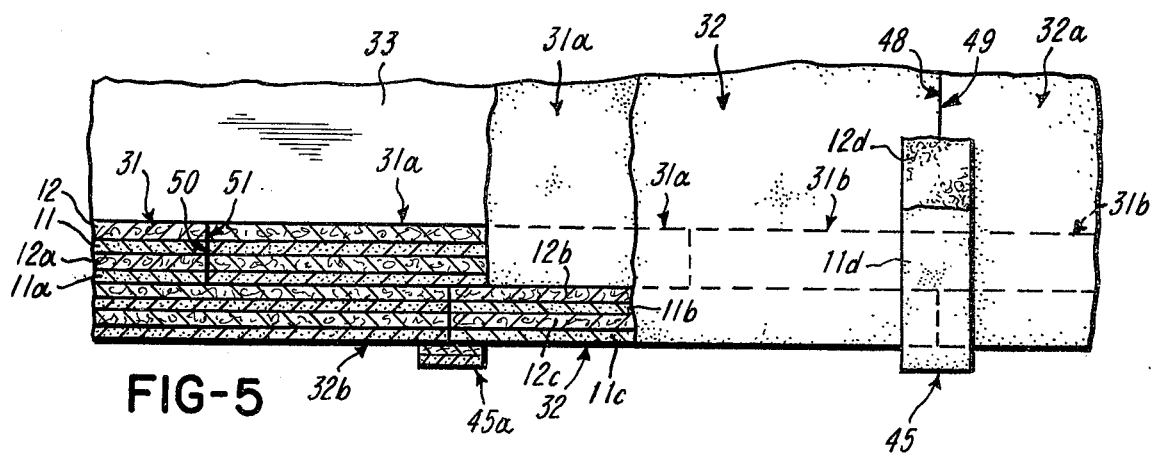

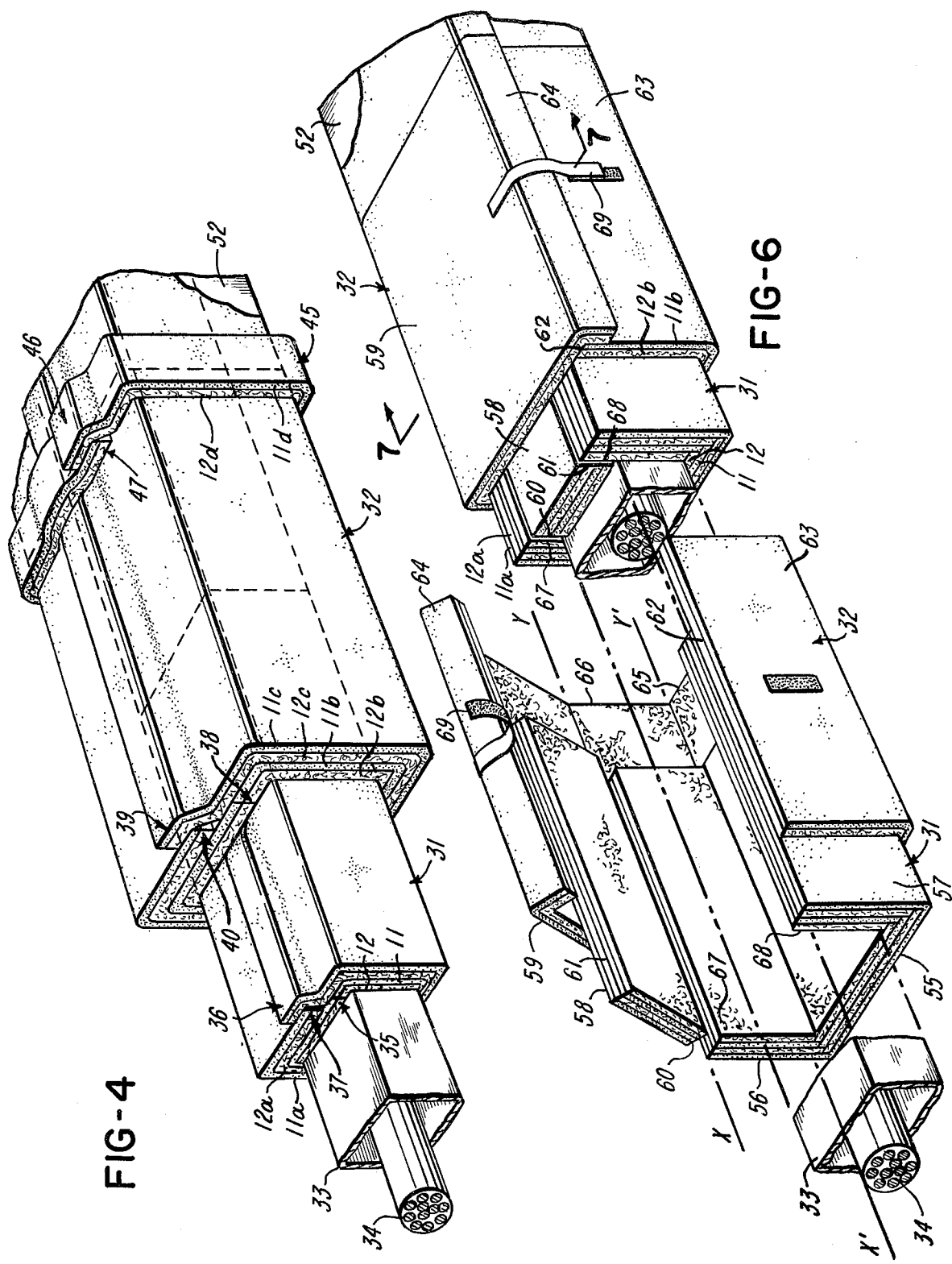

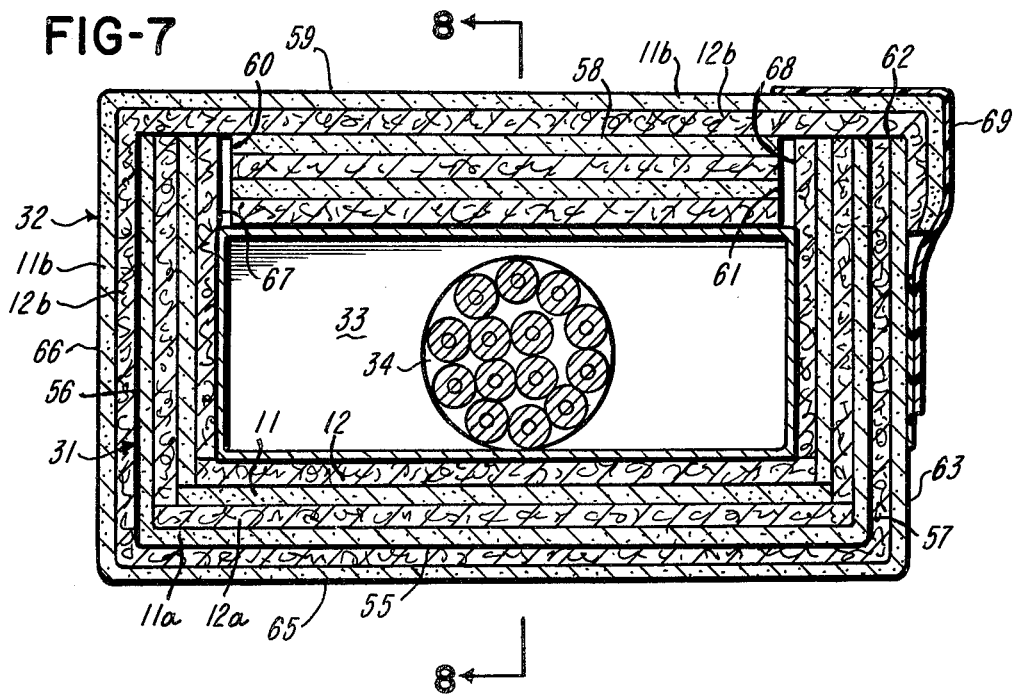
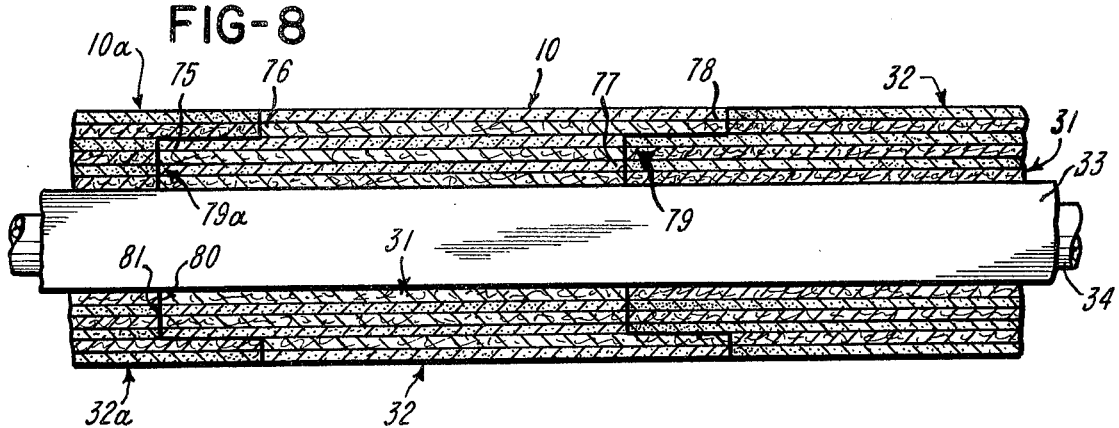

INSULATION DEVICE FOR PROTECTION AGAINST HEAT

FIELD OF INVENTION

This invention relates to an insulation device used in protecting electric cables, pneumatic or hydraulic lines, switch boxes, pipes and the like from intense heat.

BACKGROUND OF INVENTION

In oil refineries, paint plants, chemical plants, and other types of operations where highly inflammable and volatile materials are present, there is great danger of fire. Fire could be caused by such things as high pressure leaks of a volatile material, lightning, ignited vapors, switch failure, adverse chemical reactions, and human failure. These fires are quite often very costly and difficult to stop.

If a fire starts, it is essential that there be an orderly shut down of a variety of operations in order not to have catastrophic loss of equipment and materials due to explosions, etc. In an oil refinery, for example, it takes approximately 30 minutes to shut down the operation in an orderly manner. Since oil fires fanned by winds frequently approach temperatures of 2000° F., it is essential that an insulation be used which can protect the cables, pipes, etc., through which the normal shut down signals and/or liquid flow can be controlled for that specified period of time.

Historically, many different types of insulation materials and devices have been used to protect elements from heat. Some of the materials used have been asbestos; asbestos-cement; glass fiber mats; asbestos paper having spaces filled with fluffy asbestos fibers; combinations of asbestos with mineral wool, cotton, cork and plastic magnesia; magnesium carbonate; felt in combination with asbestos, linen, canvas and hair; and various combinations of asbestos and metallic tape. One of the insulation materials previously used around pipes in a steam boiler, was a mixture of glass fiber, pearlite, clay, asbestos, resin and silicone. This insulation, however, was suitable only for insulating surfaces having temperatures of approximately 1000° F.. The above mentioned insulations were adequate in many respects for their intended use involving relatively low temperatures and little weight and/or size considerations. However, where the temperature approaches 2000° F. and the weight and configuration of the insulating device about the element to be insulated are important because of space and strength considerations, none of the insulations historically used could do the job required. Even at lower temperatures, some of the previously used insulations approached a foot or more in thickness to offer the heat protection required.

The subject invention was derived from extensive experimentation utilizing a tremendous variety of insulating materials as well as combinations and mixtures of these insulating materials. Researched were such exotic combinations as fiberglass spacers and obliqueing cork. One of the key problems solved by the subject invention was to control the rate of heat transfer at a temperature differential in the range of 1500° F. to 2200° F. between the outside surface of the insulation device and the internal element which was to be protected. This invention was designed to allow for approximately 30 minutes protection against the high heat by controlling the rate of heat transfer.

The inventive insulation device was designed to provide protection against heat transmitted by conduction, radiation and convection. The materials and design defined by this device accomplish this purpose. One of the materials used is asbestos mill board which is an inorganic noncombustible fiber combined with starch and a small amount of iron oxide. These materials are beater mixed in water to make a slurry which is then rolled into various thicknesses and densities. This results in an asbestos mill board having a density in the range of 45 to 165 pounds per cubic foot. The preferred asbestos mill board used by the subject invention has a density in the range of 70 through 95 pounds per cubic foot. This range is preferable for several reasons. If the density is too light (below 70 pounds per cubic foot), the impingement or force of the flames created by a raging fire will degenerate/disintegrate the material. On the other hand, if the density is too high (over 95 pounds per cubic foot), there will be fewer entrapped air cells in the material which will reduce its insulating qualities.

Additionally, the asbestos mill board described has an excellent ablative characteristic when subjected to intense heat. This ablative effect results in the erosion/vaporization of this material to cast off or dissipate the heat rather than absorbing it. After a period of time under intense heat, the asbestos mill board loses some of its insulating properties. However, the outer layer of asbestos mill board becomes a glowing shell which burns the oxygen surrounding it and thereby acts as a fire shield or back fire. This reaction helps retard the external heat from penetrating to the element being insulated.

The second material used in the subject invention is a multi air cell non combustible material. The preferable type used is a high temperature fiberglass which is long fibered and electronically needled together making phenolic, resin or other binders unnecessary. Since there are no binders to burn out, the glass fibers and millions of air cells contained therein have a tremendous ability to absorb heat. Another multi air cell non combustible material that can also be used is ceramic fiber.

In order to take advantage of the heat resisting characteristics of the above mentioned materials, they are combined in layers which are in an alternating sequence; i.e., a layer of asbestos mill board is adjacent a layer of high temperature fiberglass. This configuration resists intense heat. For example, a fire propagated by a fuel or mixture of fuels and fanned by a wind to reach a temperature of 2000° F. has an impingement factor that will penetrate and/or tear down most materials. If the outer layer of the inventive structure is asbestos mill board, the flame or heat coming into contact with it results in an ablative action whereby the insulating properties of the asbestos mill board creates a barrier against impingement to the next layer (fiberglass). As the asbestos mill board gradually decomposes, the heat transfers to the fiberglass which in turn is used as a heat sink (or soak) because of the millions of air cells therein. As these air cells become hot after a period of time, the smaller glass fibers melt out and the larger fibers form a glass web shell. This web shell will glow under the impact of the high temperature thereby consuming oxygen and preventing this oxygen from helping combustion. If another layer of asbestos mill board is used, the amount of oxygen reaching it to support combustion has been greatly reduced.

The layers of fiberglass and asbestos mill board can also be reversed with the fiberglass being the outside layer. If such is the case, then it is desirable to use a non-combustible coating on the exterior surface of the fiberglass. This coating can be of paint, plaster, clay mixture or one of many other such coatings. This coating will protect the fiberglass from the weather, strong drafted flames, and human handling. In many instances, for the same reasons stated herein, it would also be desirable to put a similar coating on the external surface of the asbestos mill board if it formulates the external layer of the inventive device.

It is also obvious that the structure defined above can comprise more than two layers; i.e., a layer of fiberglass and a layer of asbestos mill board. The structure can also comprise a plurality of layers of fiberglass in alternating sequence with a plurality of layers of asbestos mill board. The thickness of each of the layers and the total number of layers used can be varied to obtain a structure that can be used to insulate against varying degrees of high temperature for varying periods of time.

The insulation structure comprising the multi air cell non combustible fiberglass and asbestos mill board discussed above was found to be tremendously effective if configured into an insulation device having an inner portion and an outer portion comprising layers of these materials. Normally, the inner portion and the outer portion are of similar thicknesses. Configurations involving these inner and outer portions which appear to offer maximum protection against intense heat are set forth as inventive features.

The subject inventive insulation device allows great variations in the control over the thickness, weight and number of layers of insulation used to provide protection against the degree of external heat expected and the length of time required for an orderly shut down before the internal heat rises to a temperature that would either destroy or make the control cables, pneumatic or hydraulic lines, switch boxes, etc., malfunction.

SUMMARY OF INVENTION

To avoid the problems discussed above, it is desirable to provide a unique type of insulation device to be used in the protection of electric cables, pneumatic or hydraulic lines, switch boxes, pipes and the like from intense heat.

A feature of the subject invention is to provide a novel insulation device in a configuration comprising a minimum of one layer of multi air cell non combustible material, such as high temperature fiberglass, in conjunction with an alternating layer of asbestos mill board which will protect an element that is being insulated from intense heat.

Another feature of this invention is the provision of a plurality of layers of multi air cell non combustible material, such as high temperature fiberglass, and asbestos mill board in alternating sequence that can be configured in a variable number of layers and thicknesses to comply with differing heat intensity, size and weight requirements.

Still another feature of this invention is the embodiment of inner and outer layers of insulation in a unique configuration for isolating an element being insulated from high temperature external heat penetration.

An additional feature of this invention is an embodiment comprising a configuration of an inner and outer insulation portion which allows the insulation device to be in an open position to encompass an element to be insulated and in a closed position thereafter; this configuration further insulating cracks between the edges of these insulation portions as well as maintaining a close fit there between for protection against the transmission of external heat.

A further feature of this invention is to provide an insulating device that is compact, lightweight and easy to use.

Other features and advantages of the invention will be apparent from the following description taken in conjunction with the accompanying drawings wherein:

FIG. 1 is a perspective view with parts broken away of one embodiment of the insulation device with two layers of insulating material.

FIG. 2 is a perspective view with parts broken away of another embodiment of the insulation device having four layers of insulating material.

FIG. 3 is a perspective view with parts broken away of the insulating device comprising two layers of insulating material circumscribing an element to be insulated.

FIG. 4 is a perspective view with parts broken away of still another embodiment of the insulating device comprising inner and outer insulation portions in conjunction with an overlapping collar in specific relationship with each other and configured to circumscribe an element being insulated.

FIG. 5 is an elevational view of the insulating device shown by FIG. 4 with portions broken away.

FIG. 6 is a perspective view with parts broken away of an embodiment of the insulating device comprising inner and outer insulation portions in specific relationship with each other and having a side configured to open and close about an element being insulated.

FIG. 7 is a sectional view taken substantially on line 7—7 of FIG. 6.

FIG. 8 is a sectional view taken substantially on line 8—8 of FIG. 7.

In the embodiment shown by FIG. 1, an insulating device is set forth having two layers of insulation material. The outer layer of insulation material is asbestos 11 and the inner layer of insulation material is fiberglass 12. The asbestos insulation layer 11 is preferably specifically composed of a high temperature asbestos mill board with a density range of 70 through 95 pounds per cubic foot. The fiberglass insulation layer 12 is preferably specifically composed of high temperature electronic needled fiberglass. The layers of insulation material 11 and 12 are affixed together at end portion 13 by any number of means such as glue, staples or being sewn together. The opposite end portion 14 of the insulating device does not have the two layers affixed together and therefore the fiberglass layer 12 is free to move relative to the asbestos layer 11 at this end when the insulating device is wrapped about an element to be insulated. This is necessary because the outer layer of asbestos 11 has to go around a greater circumferential length than the inner layer of fiberglass 12 when the insulating device is wrapped around the element to be insulated. The greater circumferential length of the outer layer of asbestos 11 is required because it must not only circumscribe the element to be insulated, but must also circumscribe the inner layer of fiberglass 12 which results in the outer layer 11 always having to go a greater distance than the inner layer 12. The outer asbestos layer 11 not only is free to move relative to the inner fiberglass layer 12 when it circumscribes the greater circumferential length, it is also of a greater length than the inner fiberglass layer 12 in order to cover the greater distance. This greater length is shown by the extended end portion 15 of asbestos layer 11.

It is obvious that a greater number of layers of asbestos and fiberglass can be used than the two layers shown by FIG. 1. Depending on temperature, weight and size requirements, an infinite number of layers of insulation material and thicknesses can be used. As an example, a build up of four layers is shown by FIG. 2. The insulating device is configured with layers of asbestos 11 in an alternating sequence with layers of fiberglass 12. Again the layers of insulation are affixed together at end portion 13 and have staggered extended lengths at end portions 16 to compensate for the different circumferential lengths required when circumscribing an element to be insulated and the number of inner layers of insulation which must also be circumscribed. The embodiment shown by FIG. 2 can be extended to an infinite number of layers of insulation comprising layers of fiberglass and asbestos configured in an alternating sequence. Although the embodiments shown by FIG. 1 and FIG. 2 have the layer of asbestos 11 as the outermost layer, it is also possible to reverse the alternating sequence of asbestos layers 11 and fiberglass layers 12 in order to have the outermost layer as a fiberglass layer 12 instead of an asbestos layer 11.

In the embodiment shown by FIG. 3, the insulating device shown by FIG. 1 is applied as a wrap about an element 21 to be insulated, such as a conduit. The element to be insulated 21 is circumscribed by the insulating device, which preferably has a circumferential length slightly greater than twice the circumference about the element 21 plus thicknesses of insulation material. This results in the insulating device circumscribing the element to be insulated 21 at least twice resulting in a minimum of a double thickness of the insulating device being used with a slight overlap having three thicknesses. As a consequence, there is a minimum of two layers of asbestos 11 and two layers of fiberglass 12 in this embodiment, with three layers of each in the overlap end portion 22. It is obvious that the insulating device used as a wrap could have more than the two layers of asbestos and fiberglass shown in the configuration of FIG. 1. For example, the configuration of the insulation device shown by FIG. 2 could also be utilized in a slightly greater than double wrap thereby resulting in a minimum of four layers of asbestos 11 and four layers of fiberglass 12 with six layers of each in the overlap end portion 22. In addition, if required, more than two wraps about the element to be insulated 21 can be made with an insulating device having a longer circumferential length.

The embodiment of the subject invention shown by FIG. 4 provides for an inner insulation portion 31 and an outer insulation portion 32 in a unique configuration. In this embodiment, the inner insulation portion 31 circumscribes an element to be insulated which is a duct 33 containing cables 34. The inner insulation portion 31 is made up of a first layer of fiberglass 12 and an adjacent first layer of asbestos 11 circumscribing duct 33 and having their circumferential ends 35 in abutment with each other. These first layers of insulating material completely circumscribe duct 33 without any overlap thicknesses of material to keep down bulkiness. The inner insulation portion 31 embodied also has a second layer of fiberglass 12a and an adjacent second layer of asbestos 11a circumscribing the first layers of fiberglass 12 and asbestos 11. The second layers of asbestos 11a and fiberglass 12a are of sufficient circumferential length to enable one circumferential end portion 36 of these second layers to overlap the opposite circumferential end portion 37. The overlapping end portion 36 helps prevent external heat from penetrating between the juncture of these opposite end portions in the configuration described.

Also in the embodiment shown by FIG. 4, the outer insulation portion 32 circumscribes the inner insulation portion 31. This outer insulation portion 32 is composed of a first layer of fiberglass 12b and an adjacent first layer of asbestos 11b circumscribing the inner insulation portion 31 and having their circumferential ends 38 in abutment with each other. These first layers of insulating material completely circumscribe the inner insulation portion 31 without any overlap thickness of material to keep down bulkiness. The outer insulation portion 32 embodied also has a second layer of fiberglass 12c and an adjacent second layer of asbestos 11c circumscribing the first layers of fiberglass 12b and asbestos 11b. The second layers of asbestos 11c and fiberglass 12c are of sufficient circumferential length to enable one circumferential end portion 39 of these second layers to overlap the opposite circumferential end portion 40. The overlapping end portion 39 helps prevent external heat from penetrating between the juncture of these opposite end portions in the configuration described.

Included in the embodiment shown by FIG. 4 is a collar 45 which circumscribes the outer insulation portion 32. The collar 45, as depicted by this figure, has two layers of insulation; the first layer is of fiberglass 12d and the second layer is of asbestos 11d. The collar 45 is of sufficient circumferential length to enable one circumferential end portion 46 overlap the opposite circumferential end portion 47. The overlapping end portion 46 helps prevent heat from penetrating between the juncture of these opposite end portions. FIG. 5 shows the positioning of collar 45 as it circumscribes the abutting end sections 48 and 49 of two adjacent outer insulation portions 32 and 32a respectively. The collar 45 is centered about these abutting end sections 48 and 49 and thereby reducing heat penetration between them. A similar collar 45a is shown centered about abutting outer insulation portions 32 and 32b.

Also shown by FIG. 5 is the staggered relationship between abutting inner insulation portions 31, 31a and 31b and outer insulation portions 32, 32a and 32b. Inner insulation portions 31 and 31a are in abutment with each other with end section 50 of inner insulation portion 31 in abutment with end section 51 of inner insulation portion 31a. The outer insulation portion 32b circumscribes and is centered substantially about end sections 50 and 51. As can be seen, this results in a staggered relationship between inner insulation portions 31 and 31a with the outer insulation portion 32b. The outer insulation portion 32b prevents heat from penetrating between the abutting end sections 50 and 51 of the inner insulation portions 31 and 31a. A similar configuration exists between inner insulation portions 31a and 31b with the outer insulation portion 32.

In the insulating device embodied by FIG. 4 and FIG. 5, the asbestos insulation layers are preferably of a high temperature asbestos mill board with a density range of 70 through 95 pounds per cubic foot. The fiberglass insulation layers embodied by these two FIGURES are preferably of high temperature electronic needled fiberglass. In addition, a non-combustible coating such as a water soluble outdoor house paint 52 covers the exterior surface of the inventive insulating device. It is also obvious that the insulating device embodied by FIGS. 4 and 5 could have differing numbers of layers of asbestos and fiberglass as well as the asbestos and fiberglass being in a differing alternating sequence when making up layers of insulation.

In the embodiment of the subject invention shown by FIG. 6, the inner insulation portion 31 and outer insulation portion 32 are configured to interact with each other in a unique manner. The inner insulation portion 31 circumscribes the element to be insulated 33; and in turn the inner insulation portion 31 is circumscribed by the outer insulation portion 32. The inner insulation portion in this configuration is again made up of alternating layers of fiberglass 12 and asbestos 11. One embodiment of this inner insulation portion 31 is shown in detail by FIG. 7. The edges of bottom section 55 are affixed by means of adhesive, etc., to the edges of sides 56 and 57 in a "step like" configuration except for the outermost layer of asbestos 11a. This outer most layer of asbestos 11a is one continuous unbroken layer of insulating material. It circumscribes both the inner layers of bottom section 55 as well as sides 56 and 57 thereby including the edges where they are joined together; the outermost layer of asbestos 11a thus reducing heat penetration between the abutting "steps" where the bottom section and sides are joined together.

Top Section 58 of inner insulation portion 31 is not affixed to sides 56 and 57 of that inner insulation portion. The edges 60 and 61 of top section 58 of the inner insulation portion 31 are free from the main body of inner insulation portion 31. Top section 58, however, is physically attached to top section 59 of outer insulation portion 32.

The outer insulation portion 32, as shown by FIG. 6, is composed of alternating layers of fiberglass 12b and asbestos 11b. The top section 59 of outer insulation portion 32 is configured with sufficient circumferential length to overlap the adjacent longitudinal edge 62 of adjacent side 63 of outer insulation portion 32. The overlap portion 64 reduces heat penetration between abutting top section 59 and side 63 of the outer insulation portion 32.

FIG. 6 also shows the applicability of the insulating device defined to engage and disengage the element being insulated 33. Top section 59 of outer insulation portion 32 opens and closes in relationship to side 63 of outer insulation portion 32. The opening and closing of top section 59 is effected by a rotational movement about a substantially longitudinal axis along outer insulation portion 32. For example, top section 59 as it opens and closes could rotate about axis X–Y by flexing the insulation layers of outer insulation portion 32 about that axis and thereby having an effect as if axis X–Y were a hinge like element. The longitudinal axis could be shifted so that it is anywhere along (see FIG. 7) top section 59, bottom Section 65, or sides 63 and 66 of outer insulation portion 32. This axis is any place where the outer insulation portion 32 can flex along a longitudinal axis to allow top section 59 to open and close in relationship to side 63 with a rotational motion about that axis (see FIG. 6, $X^1-Y^1$, for another example).

As can be seen by FIGS. 6 and 7, the top section 58 of the inner insulation portion 31 is affixed to the top section 59 of the outer insulation portion 32. As the top section 59 of outer insulation portion 32 moves to open and close against side 63, it necessarily follows that top section 58 of inner insulation portion 32 also moves correspondingly because of the two sides being affixed to each other. Consequently, the insulating device can be placed about the element being insulated 33 because an entire section of the insulating device swings open to encompass that element; that entire section being both the top section 58 of the inner insulating portion 31 and top section 59 of the outer insulation portion 32. When top section 59 of the outer insulation portion 32 is in a closed position by being in abutment against side 63 of that outer insulation portion; the edges 60 and 61 of top section 58 of inner insulation portion 31 are in close proximity with adjacent edges 67 and 68 of the main body of inner insulation portion 31. The top section 59 of outer insulation portion 32 can be held against side 63 by a variety of fastening means. In the embodiment shown by FIG. 6, tape 69 is used to hold top section 59 against side 63 when it is in a closed position.

FIG. 8 is a further embodiment of the subject invention shown by FIGS. 6 and 7 showing end sections of the insulating device in a configuration permitting engagement of a plurality of these insulating devices in a telescopically slidable manner. End section 75 of the inner insulation portion 31 extends beyond corresponding end section 76 of the outer insulation portion 32. The opposite end section 77 of inner insulation portion 31 is configured so that it does not extend as far in a longitudinal direction as corresponding end section 78 of outer insulation portion 32. This results in a recessed section 79 being formed within the insulating device 10. The extended end section 75 of inner insulation portion 31 and the recessed section 79 thereof are complementary to each other. Insulating device 10 is telescopically fitted into a similar second insulating device 10a. The extended end section 75 of the inner insulation portion 31 of insulating device 10 fits within the complementary recessed section 79a of the outer insulation portion 32a of a second insulating device 10a. This results in insulating devices 10 and 10a being in abutment with each other while engaged in this telescopic fit. The telescopic fit, of course, allows the outer insulation portion 32a to cover any crack between adjacent inner insulation end portions 80 and 81 of two mating insulating devices 10 and 10a.

It is again obvious that the insulating device and/or combination of insulating devices embodied by FIGS. 6–8 could have differing numbers of layers of asbestos and fiberglass as well as the asbestos and fiberglass being in a differing alternating sequence when making up layers of insulation. In addition, as shown by FIG. 6, a non-combustible coating, such as a water soluble outdoor house paint 52 covers the exterior surface of the inventive insulating device. Another preferable embodiment is the fiberglass insulation layers being composed of a high temperature electronic needled fiberglass. The asbestos insulation layers are preferable of a high temperature asbestos mill board with a density range of 70 through 95 pounds per cubic foot.

While certain embodiments of my invention have been shown and described, it is understood that it is capable of many modifications. Changes, therefore, in the construction and arrangement may be made with-

I claim:

1. An insulating device comprising a plurality of layers of insulation material, said layers of insulation material comprising a minimum of one layer of multi air cell non combustible material consisting of high temperature electronic needled fiberglass or ceramic fiber and one layer of high temperature asbestos mill board with any additional layers comprising layers of said multi air cell non combustible material and asbestos mill board configured in an alternating sequence, said layers of said multi air cell non combustible material and said asbestos mill board further configured in a variable number of layers and thicknesses per layer to provide insulation protection in conformance with a varying range of high temperatures.

2. An insulating device as claimed by claim 1, said asbestos mill board comprising a density range of 70 through 95 pounds per cubic foot.

3. An insulating device as claimed by claim 1 comprising an inner insulation portion and an outer insulation portion, said inner insulation portion comprising a plurality of layers of insulation material, said layers of insulation material of said inner insulation portion comprising a minimum of one layer of said multi air cell non combustible material and one layer of said asbestos mill board with any additional layers comprising layers of said multi air cell non combustible material and said asbestos mill board configured in an alternating sequence, said outer insulation portion comprising a plurality of layers of insulation material, said layers of insulation material for said outer insulation portion comprising a minimum of one layer of said multi air cell non combustible material and one layer of said asbestos mill board with any additional layers comprising layers of said multi air cell non combustible material and said asbestos mill board configured in an alternating sequence.

4. An insulating device as claimed by claim 3, said asbestos mill board comprising a density range of 70 through 95 pounds per cubic foot.

5. An insulating device as claimed by claim 1, said insulating device configured to circumscribe an element being insulated and being of sufficient circumferential length to enable one circumferential end portion of said insulating device to overlap the opposite circumferential end portion of said insulating device covering said element, said overlap reducing heat penetration between the juncture of said end portions to said insulated element.

6. An insulating device as claimed by claim 3 said insulating device configured to circumscribe an element being insulated, said inner insulation portion configured to circumscribe said element and being of sufficient circumferential length to enable one circumferential end portion to overlap the opposite circumferential end portion of said inner insulation portion covering said element, said outer insulation portion configured to circumscribe said inner insulation portion and being of sufficient circumferential length to enable one circumferential end portion to overlap the opposite circumferential end portion of said outer insulation portion, said overlaps of said end portions of both said inner and outer insulation portions reducing heat penetration between said end portions of both said inner and outer insulation portions.

7. An insulating device as claimed by claim 3 said insulating device configured to circumscribe an element being insulated, said inner insulation portion comprising first layers of said asbestos mill board and said multi air cell non combustible material circumscribing said element being insulated with each of said layers having a circumferential length of a magnitude short enough to prevent the opposite circumferential end portions thereof from overlapping, said inner insulation portion further comprising second layers of said asbestos mill board and multi air cell non combustible material circumscribing said first layers of said inner insulation portion, said second layers being of sufficient circumferential length to enable one circumferential end portion to overlap the opposite circumferential end portion of said second layers, said outer insulation portion configured to circumscribe said inner insulation portion, said outer insulation portion comprising first layers of said asbestos mill board and multi air cell non combustible material with each of said layers having a circumferential length of a magnitude short enough to prevent the opposite circumferential end portions thereof from overlapping, said outer insulation portion further comprising second layers of said asbestos mill board and multi air cell non combustible material circumscribing said first layers of said outer insulation portion, said second layers being of sufficient circumferential length to enable one circumferential end portion to overlap the opposite circumferential end portion of said second layers of said outer insulation portion, said non overlapping end portions of said first layers of said inner and outer insulation portions in conjunction with said overlapping of said opposite circumferential end portions of said second layers of said inner and outer insulation portions reducing heat penetrating through said inner and outer insulation portions while limiting the bulkiness of said insulating device.

8. An insulating device as claimed by claim 7 said first layers of said inner insulation portion circumscribing said element being insulated and having opposite circumferential end portions of each of said layers in abutment with each other, said first layers of said outer insulation portion configured to circumscribe said inner insulation portion and having opposite circumferential end portions of each of said layers of said outer insulation portion in abutment with each other, the abutment of said first layers of said inner and outer insulation portions reducing heat penetration through said inner and outer insulation portions while limiting the bulkiness of said insulating device.

9. An insulating device as claimed by claim 2, said insulating device comprising an end section of said inner insulation portion configured to extend beyond the corresponding end section of said outer insulation portion, the opposite end section of said inner insulation portion configured to form a recess in relationship to the corresponding opposite end section of said outer insulation portion, said extended portion of said inner insulation portion and said defined recess being complementary to each other.

10. An insulating device comprising an inner insulation portion and an outer insulation portion circumscribing said inner insulation portion, said inner insulation portion comprising a plurality of layers of insulation material, said layers of insulation material of said inner insulation portion comprising a minimum of one layer of multi air cell non combustible material consisting of high temperature electronic needled fiberglass or ceramic fiber and one layer of high temperature asbestos mill board with any additional layers comprising layers of said multi air cell non combustible material and asbestos mill board configured in an alternating sequence, said outer insulation portion comprising a plurality of layers of insulation material, said layers of insulation material for said outer insulation portion comprising a minimum of one layer of said multi air cell non combustible material and one layer of asbestos mill board with any additional layers comprising layers of said multi air cell non combustible material and asbestos mill board configured in an alternating sequence, said insulating device configured to circumscribe an element being insulated, said inner insulation portion configured to circumscribe said element and being of sufficient circumferential length to enable one circumferential end portion to overlap the opposite circumferential end portion of said inner insulation portion covering said element, said outer insulation portion configured to circumscribe said inner insulation portion and being of sufficient circumferential length to enable one circumferential end portion to overlap the opposite circumferential end portion of said outer insulation portion, a plurality of adjacent said inner insulation portions circumscribing said element being insulated, an end section of one of said inner insulation portions in abutment with an end section of a second adjacent inner insulation portion, said outer insulation portion arranged in a staggered relationship with said two abutting inner insulation portions so that said outer insulation portion circumscribes and covers the abutting end sections of said inner insulation portions, said overlaps of said circumferential end portions of both said inner and outer insulation portions combined with said outer insulation portion covering said abutting end sections of said inner insulation portions reducing heat penetration to said element being insulated.

11. An insulating device claimed by claim 10 comprising a collar element, said collar element comprising a plurality of layers of insulation material, said layers of insulation material comprising a minimum of one layer of multi air cell non combustible material consisting of high temperature electronic needled fiberglass or ceramic fiber and one layer of high temperature asbestos mill board with any additional layers comprising layers of said multi air cell non combustible material and asbestos mill board configured in an alternating sequence, a plurality of adjacent said outer insulation portions, an end section of one of said outer insulation portions in abutment with an end section of a second adjacent outer insulation portion, said collar element encompassing said abutting end sections of said two adjacent outer insulation portions, said collar element additionally being of sufficient circumferential length to have one circumferential end portion of said collar element overlap the opposite circumferential end portion of said collar element while encompassing said abutting end sections of said outer insulation portions, said encompassing collar element reducing heat penetration between said abutting end sections to said element being insulated.

12. An insulating device as claimed by claim 11, said asbestos mill board comprising a density range of 70 through 95 pounds per cubic foot.

13. An insulating device comprising an inner insulation portion and an outer insulation portion circumscribing said inner insulation portion, said inner insulation portion comprising a plurality of layers of insulation material, said layers of insulation material of said inner insulation portion comprising a minimum of one layer of multi air cell non combustible material consisting of high temperature electronic needled fiberglass or ceramic fiber and one layer of high temperature asbestos mill board with any additional layers comprising layers of said multi air cell non combustible material and asbestos mill board configured in an alternating sequence, said outer insulation portion comprising a plurality of layers of insulation material, said layers of insulation material for said outer insulation portion comprising a minimum of one layer of said multi air cell non combustible material and one layer of said asbestos mill board with any additional layers comprising layers of said multi air cell non combustible material and asbestos mill board configured in an alternating sequence, said insulating device configured to circumscribe an element being insulated, a first side of said insulating device, said first side being configured to abut an adjacent second side, said first side configured to open and close with reference to said second adjacent side, said insulating device thereby engaging or disengaging said element being insulated when said first side is in an open position and thoroughly insulating said element when said first side is in a closed position about said element.

14. An insulating device as claimed by claim 13 said first side of said insulating device configured with sufficient circumferential length to overlap and cover the adjacent substantially longitudinal edge of said adjacent second side.

15. An insulating device as claimed by claim 14, said insulating device comprising an end section of said inner insulation portion configured to extend beyond the corresponding end section of said outer insulation portion, the opposite end section of said inner insulation portion configured to form a recess in relationship to the corresponding opposite end section of said outer insulation portion, said extended portion of said inner insulation portion and said defined recess being complementary to each other.

16. An insulating device as claimed by claim 13 said first side configured to open and close against said second adjacent side by rotational movement about a substantially longitudinal axis to effect a rotational movement of said first side as if affixed to a hinge like element.

17. An insulating device as claimed by claim 16, said first side of said insulating device comprising a first side of said outer insulation portion to which is affixed a first side of said inner insulation portion, the edges of said first side of said inner insulation portion being unattached to the remainder of said inner insulation portion, said first side of said inner insulation portion being further configured to have its edges in close proximity with the adjacent edges of said remainder of said inner insulation portion when said first side of said insulating device is in a closed position, this configuration providing great flexibility in opening and closing said first side of said insulating device while reducing heat penetration between said edges when said first side is in a closed position.

18. An insulating device as claimed by claim 13, said asbestos mill board comprising a density range of 70 through 95 pounds per cubic foot.

* * * * *